United States Patent Office 3,595,845
Patented July 27, 1971

3,595,845
POLYMERIZATION OF CYCLIC ALKYLENE OXIDE WITH METHACRYLONITRILE USING AN ORGANOMETALLIC CATALYST
Hideo Tomomatsu, Austin, Tex., assignor to Jefferson Chemical Company, Houston, Tex.
No Drawing. Filed May 5, 1969, Ser. No. 821,983
Int. Cl. C08f 3/78, 7/12
U.S. Cl. 260—88.7                                   7 Claims

ABSTRACT OF THE DISCLOSURE

High molecular weight polymers having a high degree of crystallinity are obtained from the copolymerization of cyclic alkylene oxide with methacrylonitrile using a catalyst of an organometallic compound of the formula $MZX_{y-1}$ where M is a metal of zinc, magnesium, cadmium, beryllium or aluminum, Z is an alkylaryl group containing from one to 18 carbon atoms, X is hydrogen, halogen, Z, an alkoxy or aryloxy group containing 1 to 18 carbon atoms, and y is a whole number equal to the valent of M. The polymers obtained by the process of my invention are useful in the elastomer field.

CROSS REFERENCE TO RELATED APPLICATION

My co-pending U.S. application Ser. No. 821,982 filed May 5, 1969, describes the use of binary catalyst systems for the co-polymerization of alkylene oxide with methacrylonitrile.

BACKGROUND OF THE INVENTION

This invention is concerned with the co-polymerization of cyclic alkylene oxide with methacrylonitrile using an organometallic compound as the catalyst. The polymerization of alkylene oxide is well-known and is discussed by J. Furukawa and T. Saegusa, Polymerization of Aldehydes and Oxides, Interscience Publishers, New York (1963). The polymerization of methacrylonitrile is recorded by G. Natta and G. Dall'Asta, Chim. Ind. (Milano), 46 (12), 1429–35 (1964), and F. A. Mirabile and F. I. Weber in their U.S. Pat. 3,117,112 (1964). French Pat. 1,466,479 (1967) discloses the polymerization of propylene oxide with acrylonitrile or methacrylonitrile using a binary catalyst system containing an organozinc or an organoaluminum compound in the system.

SUMMARY OF THE INVENTION

I have developed a method for the co-polymerization of cyclic alkylene oxide with methacrylonitrile using a metal organic catalyst whereby high molecular weight polymers are obtained. In accordance with my invention, the organometallic catalyst is a compound of the formula $MZX_{y-1}$ where M is zinc, magnesium, cadmium, berylium or aluminum, Z is an alkyl or aryl group containing 1 to 18 carbon atoms, X is hydrogen, halogen, Z, an alkoxy or aryloxy group containing 1 to 18 carbon atoms, and y is a whole number equal to the valence of M.

DESCRIPTION OF THE PREFERRED EMBODIMENTS

The organometallic compound to be used in my invention is defined as one having the formula $MZX_{y-1}$ where M is zinc, magnesium, cadmium, beryllium or aluminum, Z is an alkyl or aryl group containing from 1 to 18 carbon atoms, X is hydrogen, halogen, Z, an alkoxy or aryloxy group containing 1 to 18 carbon atoms, and y is a whole number equal to the valence of M. This metallic compound will contain at least one alkyl or aryl group and may contain additional groups of alkoxy, aryloxy, hydrogen or halogen such as chlorine, bromine, or iodine. Examples of Z include methyl, ethyl, phenyl, butyl, hexyl, cyclobutyl, cyclohexyl tolyl, ethoxy, propoxy, butoxy and phenoxy. Z is preferably an alkyl group. The preferred catalyst for my invention is diethyl zinc. Other useful compounds include triethyl aluminum, diethyl aluminum hydride, ethyl aluminum dichloride, diphenyl zinc, methyl zinc phenoxide, dilauryl cadmium, phenylcyclohexylberyllium and dibenzyl cadmium.

The cyclic alkylene oxides that may be co-polymerized with methacrylonitrile in my process are those containing oxygen-carbon rings in which one oxygen atom is combined with two or three carbon atoms in the ring. The ring carbon atoms may be substituted with alkyl, aryl, cycloalkyl, alkoxyl and haloalkyl groups. The common cyclic alkylene oxides are those containing the three-membered oxirane ring. Examples of such oxides include ethylene oxide, 1,2-propylene oxide, 1,2-butylene oxide, 2,3-butylene oxide, 1,2-dodecene oxide, styrene oxide and epichlorohydrin. A typical four-membered alkylene oxide is 1,3-propylene oxide commonly referred to as oxetane. Other such cyclic oxides include 3,3-dimethyloxethane, 3,3-diethyloxetane and 3,3-di(chloromethyl)oxetane.

The polymerization may be run at a temperature within the range of 0°–200° C.; however, it is preferred to employ temperatures within the range of about 25° to about 150° C. to avoid loss of volatile components, the reaction is normally conducted in a closed vessel. The particular pressure at which the reaction is conducted is not critical, and ambient pressures are generally employed.

The concentration of catalyst in the reaction may be varied from 1 to 20 wt. percent or higher based on the total weight of methacrylonitrile and monomeric oxide. It is preferred to use from about 5 to 10 wt. percent catalyst.

The polymerization reaction should be conducted in a dry, inert atmosphere. The reaction may be run with or without solvent. When a solvent is employed a dry, inert solvent is used. The solvent may be an aliphatic or aromatic hydrocarbon or an ether. Typical solvents include cyclohexane, N-hexane, petroleum ether, pentane, heptane, benzene, toluene, diethylether and dipropylether.

The following examples illustrate my invention in more detail. Example I illustrates the co-polymerization of propylene oxide with methacrylonitrile using a diethyl zinc catalyst in a solvent. Example II illustrates the co-polymerization of propylene oxide with methacrylonitrile using a diethyl zinc catalyst with no solvent. Example III illustrates the co-polymerization of ethylene oxide with methacrylonitrile using a diethyl zinc catalyst and Example IV illustrates the co-polymerization of epichlorohydrin with methacrylonitrile using a triethyl aluminum catalyst.

EXAMPLE I

In this example, propylene oxide is co-polymerized with methacrylonitrile using a diethyl zinc catalyst in a solvent. Under a dry nitrogen atmosphere, 33.5 g. (0.5 mol) of methacrylonitrile and 200 ml. of dry cyclohexane were placed in a pressure bottle. Propylene oxide (29 g., 0.5 mol) was added to the pressure bottle contents and the mixture was stirred. Five grams of a 25% diethyl zinc solution in heptane was added to the mixture under the same inert atmosphere and the reaction vessel was closed by a stainless steeel cap equipped with a Teflon O-ring and the vessel contents were stirred by a magnetic stirrer for one hour at room temperature. During this period the color of the reaction mixture gradually darkened. Then the reaction vessel was placed in and 80° C. oil bath and subjected to shaking for 24 hours. The reaction mixture was cooled and left in open air to be dried to give 46 grams of a pale orange colored, spongy polymer. After pressure treatment, this product gave a strong sheet which showed high heat resistance, good flexibility and a soft leather-like feeling.

EXAMPLE II

In this example, propylene oxide is co-polymerized with methacrylonitrile using a diethyl zinc catalyst and no solvent. Under a dry nitrogen atmosphere, 33.5 g. (0.5 mol) of methacrylonitrile and 29.0 g. (0.5 mol) of freshly distilled propylene oxide were placed in a pressure bottle. Five grams of 25% diethyl zinc solution in n-heptane was added to the mixture under the same inert atmosphere and the reaction vessel was closed by a stainless steel cap equipped with a Teflon O-ring. The reaction mixture was subjected to shaking in an oil bath at 80° C. for 24 hours. Sixty-two grams of dark red, hard polymer was produced by this process.

EXAMPLE III

In this example, ethylene oxide is co-polymerized with methacrylonitrile using a diethyl zinc catalyst. Under a dry nitrogen atmosphere, 33.5 g. (0.5 mol) of methacrylonitrile and 200 ml. of dry cyclohexane were placed in a pressure bottle. Twenty-two grams (0.5 mol) of ethylene oxide was added to the vessel contents and the mixture was stirred magnetically. Ten grams of 25% diethyl zinc solution in n-heptane was added to the mixture under the same inert atmosphere and the reaction vessel was closed by a stainless steel cap equipped with a Teflon O-ring. The reaction mixture was subjected to shaking in an oil bath at 80° C. for 24 hours. The reaction mixture was an extremely tough, red solid. After evaporation of the solvent, 56 g. of tough, red polymer was obtained.

EXAMPLE IV

In this example, epichlorohydrin is co-polymerized with methacrylonitrile using a triethyl aluminum catalyst.

Under a dry nitrogen atmosphere, 46.2 g. (0.5 mol) of freshly distilled epichlorohydrin and 200 ml. of dry benzene were placed in a pressure bottle. Methacrylonitrile (33.5 g., 0.5 mol) was added to the vessel contents and the mixture was stirred magnetically. Triethyl aluminum (7.4 g. of 20% solution in toluene) was added to the mixture under the same inert atmosphere and the reaction vessel was closed with a stainless steel cap equipped with a Teflon O-ring. The reaction mixture was subjected to shaking in an oil bath at 80° C. for 24 hours. After polymerization, the reaction mixture was dried in open air to give 35.0 g. of yellow polymer.

Comparable results to those in the examples, supra, are obtained using other catalysts of my invention which are not illustrated.

I claim:
1. A method for the co-polymerization of methacrylonitrile and a cyclic alkylene oxide having an oxygen-carbon ring in which the oxygen atom is joined with 2 to 3 carbon atoms in the ring which comprises:

mixing the methacrylonitrile and the oxide at 0° to 200° C. in a closed vessel and in a dry inert atmosphere with from about 1 to 20 wt. percent based on the weight of reactants a catalyst of an organometallic compound having the formula $$MZX_{y-1}$$

wherein M is zinc, magnesium, cadmium, beryllium or aluminum; Z is an aryl or alkyl group containing from 1 to 18 carbon atoms; X is hydrogen, halogen, Z or an alkoxy or aryloxy group containing 1 to 18 carbon atoms and y is an integer equal to the valence of M.

2. A method as in claim 1 wherein the temperature is within the range of about 25° C. to about 150° C. and the catalyst concentration is within the range of about 5 to about 10 wt. percent based on the weight of reactants.

3. A method as in claim 1 wherein Z is an alkyl group containing 1 to 18 carbon atoms.

4. A method as in claim 3 wherein the oxide is ethylene oxide or propylene oxide.

5. A method as in claim 4 wherein the temperature is within the range of about 25° C. to about 150° C., and the concentration of catalyst is between about 5 to about 10 wt. percent based on the weight of reactants.

6. A method as in claim 5 wherein the catalyst is diethyl zinc.

7. A method as in claim 5 wherein the catalyst is triethyl aluminum.

References Cited

UNITED STATES PATENTS 3,459,685    8/1969    Tomomatsu   ---------- 260—2

HARRY WONG, Jr., Primary Examiner